Patented May 22, 1945

2,376,390

UNITED STATES PATENT OFFICE 2,376,390

POLYMERIZATION OF BUTADIENES-1,3

Waldo L. Semon, Silver Lake, Ohio, assignor to The B. F. Goodrich Company, New York, N. Y., a corporation of New York No Drawing. Application October 23, 1940, Serial No. 362,413

15 Claims. (Cl. 260—84.5)

This invention relates to the polymerization of butadienes-1,3, and particularly to a method whereby butadienes-1,3 may be polymerized in an aqueous emulsion to form products closely resembling natural crude rubber.

The emulsion polymerization of butadienes-1,3 either alone or in admixture with other butadienes-1,3 or with other compounds copolymerizable therewith to form compositions of matter more or less resembling rubber is well known. It has been commonly observed, however, that the products of such polymerization often resemble vulcanized rubber rather than natural crude rubber in respect to solubility, plasticity, and processing characteristics. Thus it has often been found that the polymers were insoluble in and, in some cases, not even swelled by benzene or acetone, and that they were tough, non-plastic materials which either would not homogenize on a mill or which were very difficult to mill and to subject to other ordinary processing operations for natural rubber.

I have now discovered a class of materials which modifies the emulsion polymerization of butadienes-1,3 in such a manner that polymers more nearly resembling natural crude rubber are produced than when the polymerization is carried on in the absence of the materials of this invention. This class of materials, which I have termed "modifiers" consists of dithioxanthogeno polysulfides. It has been previously known that the dialkylxanthogeno disulfides exhibited a somewhat similar behavior, but when sulfur has been substituted for oxygen in certain other classes of compounds, it has been observed that the modifying activity diminished or disappeared. It was unexpected, therefore, to discover that the dithioxanthogeno polysulfides possess even more desirable properties as modifiers than the dixanthogeno disulfides.

Dithioxanthogeno disulfides contain the characteristic grouping

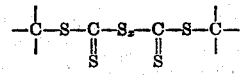

wherein $x$ is a small integer greater than 1. The carbon atoms with the unsatisfied valences preferably constitute part of a hydrocarbon radical such as methyl, ethyl, isopropyl, sec. butyl, act. amyl, 2-ethylhexyl, cyclohexyl, benzyl, phenyl tolyl, naphthyl, or similar groups, although substituents such as halogen and alkoxy groups may be attached to the hydrocarbon groups if desired. The preferred class of compounds is the dialkylthioxanthogeno polysulfides having the structural formula

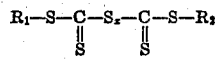

wherein $R_1$ and $R_2$ are alkyl groups and $x$ is a small integer greater than 1. Specific examples of this class of compounds include diethylthioxanthogeno disulfide, diisopropylthioxanthogeno disulfide, di-sec.-butylthioxanthogeno disulfide, di-n-amylthioxanthogeno disulfide, di-act.-amylthioxanthogeno disulfide, di-2-ethylhexylthioxanthogenodisulfide, and the higher polysulfides such as the corresponding tri- and tetrasulfides.

The invention may be better understood from the following specific examples which are to be regarded as merely illustrating preferred embodiments and not as limiting the invention in any respect.

*Example I.*—A charge containing 7.5 gm. of butadiene, 2.5 gm. of acrylonitrile, 0.035 gm. of hydrogen peroxide, 25 cc. of a 2% solution of myristic acid which had been 85% neutralized with sodium hydroxide, and 0.04 gm. of diethylthioxanthogeno disulfide was polymerized with agitation at 30° C. The resulting polymer was very plastic and 56% soluble in benzene, while a polymer prepared from similar charge which did not contain any modifier was not plastic and was nearly completely insoluble in benzene. Furthermore, the vulcanized unmodified polymer was only about four-fifths as strong and had an elongation only about five-sixths as great as a vulcanizate prepared from the polymer formed in the presence of diethylthioxanthogeno disulfide.

*Example II.*—When di-n-amylthioxanthogeno disulfide was substituted for the diethylthioxanthogeno disulfide in the above recipe, a very plastic polymer which was 21% soluble in benzene was produced.

*Example III.*—A charge containing 7.5 gm. of butadiene, 2.5 gm. of acrylonitrile, 25 cc. of a 2% solution of myristic acid which had been 85% neutralized with sodium hydroxide, 0.035 gm. of hydrogen peroxide, and a small amount of an activator for the catalyst, was polymerized with agitation in a glass vessel at 30° C. Another charge containing in addition to the above ingredients 0.05 gm. of diethylthioxanthogeno disulfide was similarly polymerized. The unmodified polymer was obtained in the form of non-coherent crumbs which were insoluble in benzene, while a very plastic polymer 60% soluble in benzene was obtained from the charge containing diethylthioxanthogeno disulfide. The unmodified polymer when vulcanized had a tensile strength of 4400 lbs./in.² and an elongation of 470%, while a similar vulcanizate prepared from the modified polymer had a tensile strength of 4500 lbs./in.² and an elongation of 610%.

While the above examples are confined to the use of disulfides as the modifiers, it will be clear to those skilled in the art that other polysulfides such as the corresponding tri- and tetrasulfides may similarly be employed. The proportion in which the modifier is included in the composition depends somewhat upon the properties desired in the copolymer, the higher proportions of modifier in general producing softer, more soluble polymers. Very small amounts of modifier such as 0.1% based on the monomer or even less may profoundly affect the nature of the polymer produced, and amounts up to 5% or over may advantageously be employed.

Although the exact manner in which the modifiers of this invention function is not understood, it is believed from the nature of the changes in properties effected by polymerizing monomers in the presence of modifying agents that these materials in some way inhibit the formation of cross-linkages but still permit the formation of long, straight chains of the polymerizable monomers. It is believed that in the absence of some agent which serves to prevent or inhibit cross-linkage, the products of emulsion polymerizations which have been carried to completion contain numerous cross-linkages which affect the properties of the polymer in much the same manner as the cross-linkages formed during the vulcanization of natural crude rubber with sulfur change the properties of the crude rubber. This theory explains why the polymers prepared in the presence of modifying agents are in general more plastic and more soluble than unmodified polymers. This theory is presented only by way of explanation and is not intended as a limitation on the invention, for regardless of the correctness of the theory, the inclusion of a dialkyl-thioxanthogeno polysulfide in emulsion polymerization batches produces the beneficial results hereinbefore described.

The modifying agents of this invention may be employed in emulsion polymerizations of any of the butadienes-1,3 such as butadiene-1,3 itself (commonly called butadiene), 2,3-dimethyl butadiene, isoprene, 2-chlorobutadiene, and piperylene, either alone or in admixture with each other or with comonomers copolymerizable therewith such as styrene, acrylonitrile, methyl methacrylate, vinyl acetate, vinylidene chloride, methyl vinyl ketone, methyl vinyl ether, and other polymerizable hydrocarbons, nitriles, esters, ketones, and ethers. These comonomers are preferably, though not necessarily, employed in minor proportions.

The polymerization of the above materials in aqueous emulsion may be effected by various catalysts such as per-compounds including hydrogen peroxide, ammonium persulfate, potassium persulfate, and other peroxides, persulfates, perborates, percarbonates, and the like, diazoaminobenzene, and dipotassium diazomethane disulfonate. When it is desired to perform the polymerization rapidly, it may be desirable to include an activator for the catalyst in the emulsion. When hydrogen peroxide is being employed as the catalyst, for instance, compounds which may form complexes with the hydrogen peroxide such as sodium pyrophosphate, sodium oxalate, potassium fluoride, urea, glycine, alanine, and the like may be employed to activate the catalyst and produce a desirable type of polymer in a shorter period of time.

Any of the ordinary emulsifying agents such as fatty acid soaps, hymolal sulfates or sulfonates, alkylated aromatic salts of high molecular weight organic bases, etc., may be employed to effect the emulsion of the monomers in the water.

Although I have herein disclosed specific embodiments of my invention, I do not intend to limit the invention solely thereto, for it will be obvious to those skilled in the art that many variations and modifications are within the spirit and scope of the invention as defined in the appended claims.

I claim:

1. The method which comprises polymerizing an aqueous emulsion of a butadiene-1,3 in the presence of a dithioxanthogeno polysulfide containing less than five sulfur atoms directly connected with each other.

2. The method which comprises polymerizing an aqueous emulsion of a butadiene-1,3 in the presence of a dithioxanthogeno disulfide.

3. The method which comprises polymerizing an aqueous emulsion of a butadiene-1,3 in the presence of a compound having the structural formula

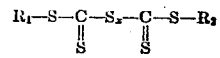

wherein $R_1$ and $R_2$ are alkyl groups and $x$ is a small integer greater than 1 but less than 5.

4. The method which comprises polymerizing an aqueous emulsion of a butadiene-1,3 in the presence of diethylthioxanthogeno disulfide.

5. The method which comprises polymerizing an aqueous emulsion of a butadiene-1,3 in the presence of di-n-amylthioxanthogeno disulfide.

6. The method which comprises polymerizing an aqueous emulsion of butadiene-1,3 in the presence of a compound having the structural formula

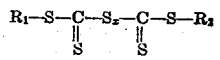

wherein $R_1$ and $R_2$ are alkyl groups and $x$ is a small integer greater than 1 but less than 5.

7. The method which comprises polymerizing an aqueous emulsion of a mixture of butadiene-1,3 and a minor proportion of acrylonitrile in the presence of a compound having the structural formula

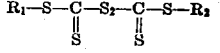

wherein $R_1$ and $R_2$ are alkyl groups.

8. The method which comprises polymerizing an aqueous emulsion of butadiene-1,3 in the presence of a compound having the structural formula

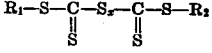

wherein $R_1$ and $R_2$ are isopropyl groups and $x$ is a small integer greater than 1 but less than 5.

9. The method which comprises polymerizing an aqueous emulsion of a mixture of butadiene-1,3 and a minor proportion of acrylonitrile in the presence of diisopropylthioxanthogeno disulfide.

10. A composition of matter prepared by the method of claim 1.

11. A composition of matter prepared by the method of claim 3.

12. A composition of matter prepared by the method of claim 5.

13. A composition of matter prepared by the method of claim 7.

14. A composition of matter prepared by the method of claim 8.

15. A composition of matter prepared by the method of claim 9.

WALDO L. SEMON.